May 14, 1935. A. JOSEPH 2,000,960
PROCESS AND APPARATUS FOR THE TREATMENT OF HEAVY OILS
Filed Dec. 11, 1930
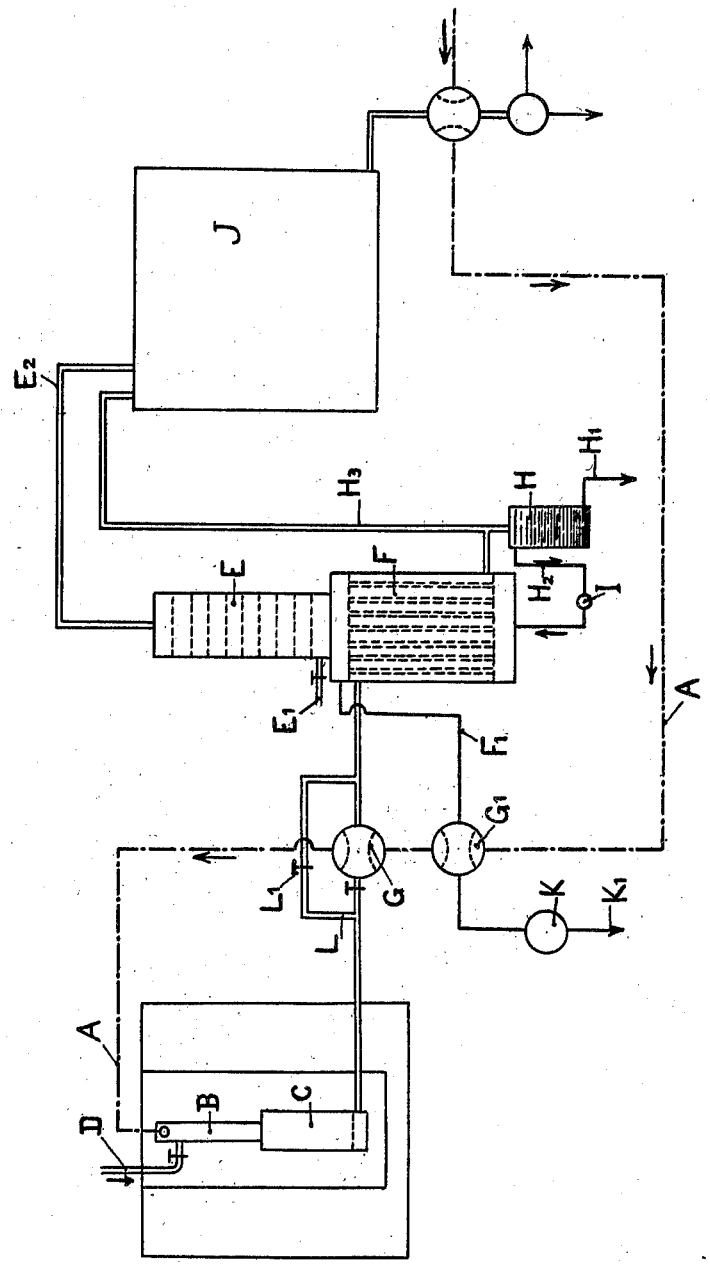
INVENTOR
Alfred Joseph.
BY Cameron, Kerkam & Sutton.
ATTORNEYS.

Patented May 14, 1935

2,000,960

UNITED STATES PATENT OFFICE 2,000,960

PROCESS AND APPARATUS FOR THE TREATMENT OF HEAVY OILS

Alfred Joseph, Enghien, France, assignor, by mesne assignments, to Houdry Process Corporation, Dover, Del., a corporation of Delaware Application December 11, 1930, Serial No. 501,691
In France November 14, 1930

13 Claims. (Cl. 196—52)

This invention relates to a process and apparatus for the continuous treatment of heavy oils with a view to their conversion into light products.

In the patent applications filed in the United States of America on December 22, 1928 (Serial Nos. 328,012 and 328,013) which issued as Patents Nos. 1,867,841 and 1,867,842 on July 19, 1932 the applicant has described and illustrated means for the continuous treatment of heavy oils, petroleum residues, and the like, with a view to their conversion into light products, by vaporization mixed with steam, such vaporization being followed by cracking in the presence of a catalyst, then dephlegmation, purification, and refining.

The operation of vaporizing and catalytic cracking requires the addition to the oils of a relatively considerable proportion of steam, which proportion may attain 15% by weight of the product to be treated. Under these conditions, a quantity of water which has become useless after the catalytic cracking operation, is, as in all purifying and refining apparatus, entrained into the dephlegmation column; the proportion of steam which it is desirable to retain being in practice about 5%, the presence in the dephlegmation column of an excess of steam constitutes a hindrance to the separation of the light products, whilst it uneconomically increases the size which it is necessary to give to the apparatus. It is the same with the purifying and refining chambers whereinto a wholly useless and cumbersome volume of vapour is entrained.

This disadvantage is suppressed by the present invention, in accordance with which the removal of the quantity of water which has become useless after the catalytic cracking, is proceeded with by effecting, before the dephlegmation, as complete as possible condensation of the oils and the water, whilst utilizing the heat yielded up during such condensation for the preliminary heating of fresh products to be led into the vaporizer-cracking chamber group, and for vaporizing the condensate, freed from water, which is thereupon treated in the dephlegmation column. In this latter, a supply of steam is provided reduced to the strictly necessary proportion, that is to say to about 5% by weight of the condensate which is to be distilled in the said dephlegmation column.

A plant for carrying out the process which has just been defined, is illustrated diagrammatically in the accompanying drawing. In this diagram B—C represent a group consisting of a vaporizer element and a catalytic cracking chamber, in accordance with the applicant's above mentioned patent applications, the oil to be treated being led into the upper portion of the vaporizer B by a pipe A, and the additional water preferably in the form of steam being supplied by a pipe D. The water or steam is not decomposed in chamber C but merely assists in the vaporizing of the oil.

The contact mass in vaporizer B comprises suitable material, such as a metal or a metal oxide for example, on a porcelain or other support of an inert porous nature. The catalytic mass in cracking chamber C consists of any suitable substance capable of effecting the desired conversion of the starting material, such as a metal, a metallic oxide, or the like. The vaporizer-cracker group B—C operates at temperatures varying between 400° and 500° C. according to the nature of the products treated. The pressures are low, usually only sufficient to carry the charge through the apparatus, as of the order of 15 pounds gauge, but higher as well as subatmospheric pressures may be used if desired.

In accordance with the invention, the gaseous mixture leaving the catalytic cracking chamber C, instead of being led directly into a dephlegmation column E, is conducted into a condenser F at a temperature ranging between 340 and 400° C. after having previously yielded up a part of its heat, in a heat exchanger G, to the crude products circulating in the feed pipe A of the vaporizer B. In the apparatus F, complete condensation is effected and the condensate is collected in a tank H, wherein separation of the water from the oils occurs. The water is removed at the lower portion by a pipe $H_1$, whereas the oil is decanted at the upper portion by a pipe $H_2$, being drawn by a pump I which sends the oil into the apparatus F, a portion of such oil is revaporized in F at the expense of the heat yielded up by the oil in the course of condensation derived from the cracking chamber. The oil thus revaporized passes directly into the dephlegmation column E, to the lower portion of which steam is admitted, by a pipe $E_1$, in a proportion strictly limited to that necessary, about 5% by weight of the matter treated in the said column. The light products leaving the column E are led, by a pipe $E_2$, into a group J wherein purification and refining is effected, preferably by catalysts such as copper for purification and nickel for refining at a temperature of 200° C. or higher in the manner indicated in the applicant's previous patent applications. Into this group is admitted at the same time, the gases which leave the upper portion of the separator H by a pipe H₃.

The level of the oil undergoing revaporization in condenser F is such that the heavy products which separate as a result of their not being revaporized are removed by a pipe F₁ and can yield up a part of their heat to the crude products to be treated, in a heat exchanger G₁, before passing, in the known manner, into a cooler K on leaving which they are taken by a pipe K₁ eventually to be returned to the operative cycle.

L denotes a by-pass provided with a cock L₁ and through which the gaseous mass coming from the cracking chamber C is passed, instead of passing such gases through the exchanger G, in the event of the products being at a sufficiently high temperature on leaving the heat exchanger G₁.

I claim:

1. In a process for the treatment of heavy oils, the steps of mixing the oil to be treated with steam, vaporizing the oil, cracking the vaporized oil in the presence of a catalyst, condensing the steam and cracked vaporized oil, separating the condensed water vapor from the oil condensate, utilizing the heat liberated during condensation of the cracked vaporized mixture for revaporizing a part of the oil condensate, mixing the revaporized oil with steam in restricted predetermined amount, and dephlegmating said last named mixture.

2. In a process for the treatment of heavy oils, the steps of mixing the oil to be treated with steam, vaporizing the oil, cracking the vaporized oil in the presence of a catalyst, condensing the steam and the cracked vaporized oil, separating the condensed water vapor from the oil condensate, revaporizing a part of the oil condensate by heat exchange with the products of the cracking step, separating the heavier unvaporized products from the revaporized oil and utilizing the heat of said products for preliminarily heating the oil to be treated, mixing the revaporized oil with a small quantity of steam, and dephlegmating said last named mixture.

3. In a process for the treatment of heavy oils, the steps of mixing the oil to be treated with water, vaporizing the mixture thus formed, cracking the vaporized mixture in the presence of a catalyst, condensing the cracked vaporized mixture, separating the condensed water vapor from the oil condensate, revaporizing a part of the oil condensate by heat exchange with the products of the cracking step, mixing the revaporized oil with steam, the relative amount of steam added to the revaporized oil being substantially less than the relative amount of water added to the oil in the first named step, and dephlegmating said last named mixture.

4. In a process for the treatment of heavy oils, the steps of mixing the oil to be treated with water, vaporizing the mixture thus formed, cracking the vaporized mixture in the presence of a catalyst, condensing the cracked vaporized mixture, separating the condensed water vapor from the oil condensate, revaporizing a part of the oil condensate by heat exchange with the products of the cracking step, mixing the revaporized oil with steam in the proportion of approximately 5% of steam by weight, and dephlegmating said last named mixture.

5. In the production and catalytic refining of low boiling hydrocarbons suitable for motor fuel such as gasoline from high boiling hydrocarbons in definite converting and refining zones the process steps which comprise converting the high boiling hydrocarbons in the presence of steam, condensing the resulting products, separating the fixed gases from the condensate and passing them directly to the refining zone, separating the condensate into water and hydrocarbons, revaporizing at least a part of the hydrocarbons by heat exchange with the products of the converting zone, fractionating the revaporized hydrocarbons in the presence of a small quantity of steam, and conducting the fractionated vapors to the refining zone.

6. In the production and catalytic refining of low boiling hydrocarbons suitable for motor fuel such as gasoline from high boiling hydrocarbons in definite converting and refining zones the process steps which comprise converting the high boiling hydrocarbons in the presence of steam, condensing the resulting products to separate the oil both from the fixed gases and from the steam or water, revaporizing a part of the oil by heat exchange with the products of the converting zone and fractionating the revaporized oil, and conducting the fixed gases and the fractionated vapors separately to the refining zone.

7. In the conversion and catalytic refining of high boiling hydrocarbons into refined low boiling hydrocarbons in definite converting and refining zones the process steps which comprise condensing the products of conversion, separating out the gaseous products of conversion and sending them directly to the refining zone, revaporizing a part of the liquid products of conversion by heat exchange with the products of the converting zone, fractionating the resulting vapors and then sending the fractionated vapors to the refining zone.

8. In the production of low boiling hydrocarbons from high boiling hydrocarbons by catalytic conversion of the same while in vapor phase and admixed with steam, the process step for adjusting the quantity of steam to a predetermined proportional amount prior to fractionation of the converted hydrocarbon vapors which comprises condensing the oil vapor-steam mixture after the catalytic conversion, removing the condensed water, revaporizing a part of the oil condensate by heat exchange with the said oil vapor-steam mixture, and adding steam in the desired amount to the revaporized oil.

9. In apparatus of the class described, the combination of a vaporizer, an oil supply line to said vaporizer, means for supplying water to said vaporizer, a catalytic cracking chamber connected to the outlet of said vaporizer, a condenser, conduit means for conducting the cracked vaporized products from said cracking chamber to the condenser, a separation tank connected to the condensation outlet of said condenser, means for drawing the condensed oil from said tank and for recirculating it through said condenser wherein it is partially revaporized, a dephlegmation column connected to the vapor outlet of said condenser, and a steam supply line connected to said dephlegmation column.

10. In apparatus of the class described, the combination of a vaporizer, an oil supply line to said vaporizer, means for supplying water to said vaporizer, a catalytic cracking chamber connected to the outlet of said vaporizer, a condenser, conduit means for conducting the cracked vaporized product from said cracking chamber to the condenser, a heat exchanger interposed in said conduit means, said heat exchanger also being connected into said oil supply line, a separation tank connected to the condensate outlet of said condenser, means for drawing the condensed oil from said tank and for recirculating it through said condenser wherein it is partially revaporized, a dephlegmation column connected to the vapor outlet of said condenser, and a steam supply line connected to said dephlegmation column.

11. In apparatus of the class described, the combination of a vaporizer, an oil supply line to said vaporizer, means for supplying water to said vaporizer, a catalytic cracking chamber connected to the outlet of said vaporizer, a condenser, conduit means for conducting the cracked vaporized product from said cracking chamber to the condenser, a separation tank connected to the condensate outlet of said condenser, means for drawing the condensed oil from said tank and for recirculating it through said condenser wherein it is partially revaporized, conduit means through which the unvaporized products are removed from said condenser after recirculation, a heat exchanger interposed in said last named conduit means, said heat exchanger also being connected into said oil supply line, a dephlegmation column connected to the vapor outlet of said condenser, and a steam supply line connected to said dephlegmation column.

12. An apparatus unit for the treatment of hydrocarbons comprising a condenser and a dephlegmating or fractionating column thereon, means within said condenser for effecting heat exchange between separated fluids, inlet and outlet connections adjacent the top and bottom of said condenser respectively for one of the fluids, said condenser having an inlet connection at the bottom for the other of the fluids and two outlets at the top of said condenser, one of said last named outlets for discharge of unvaporized fluid and the other discharging vaporized fluid directly into the bottom of said column, an additional outlet for vapors from said last named fluid at the top of said column, and a steam inlet adjacent the bottom of said column but above said condenser and all connections to the latter.

13. An apparatus unit for the treatment of hydrocarbons comprising a condenser having pairs of inlet and outlet connections, means for maintaining two fluids or vapor and liquid phases of the same fluid in separate counter flow heat exchange relation with the vapor moving downwardly and the liquid upwardly, a fractionating column on said condenser serving as a vent for vapors from the upwardly moving liquid, an outlet connection for removing unvaporized upwardly moving liquid adjacent the top of said condenser and below said column, and an inlet for steam into the bottom of said column but above said outlet connection.

ALFRED JOSEPH.